United States Patent [19]

Henrion

[11] 3,761,637

[45] Sept. 25, 1973

[54] INTERFACE BETWEEN ANALOG OR DIGITAL LINES AND A PULSE CODE MODULATION CIRCUIT

[75] Inventor: Michel Andre Robert Henrion, Boulogne-Billancourt, France

[73] Assignee: International Standard Electric Corporation, New York, N.Y.

[22] Filed: Mar. 22, 1971

[21] Appl. No.: 126,844

[30] Foreign Application Priority Data

Apr. 7, 1970 France .............................. 7012469

[52] U.S. Cl. ....... 179/15 AT, 179/15 A, 179/15 AP

[51] Int. Cl. .............................................. H04j 3/00

[58] Field of Search .................. 179/15 BY, 18 GS, 179/18 J, 18 CC, 15 A, 15 AP

[56] References Cited

UNITED STATES PATENTS

| | | | |
|---|---|---|---|
| 3,458,659 | 7/1969 | Sternung | 179/15 AQ |
| 3,585,306 | 6/1971 | Battocletti | 179/15 AQ |
| 3,403,383 | 9/1968 | Kienzle | 179/15 AT |

FOREIGN PATENTS OR APPLICATIONS

| | | | |
|---|---|---|---|
| 1,122,924 | 8/1968 | Great Britain | 179/2 DP |

*Primary Examiner*—Kathleen H. Claffy
*Assistant Examiner*—David L. Stewart
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A PCM interface circuit is disclosed which allows bi-directional transmission of supervisory signals in analog form and data signals in digital form. Analog information is coded or decoded as needed, and the type of connection necessary is determined by the type of signalling used — A.C., D.C. or multi-frequency.

2 Claims, 2 Drawing Figures

Figure 1:
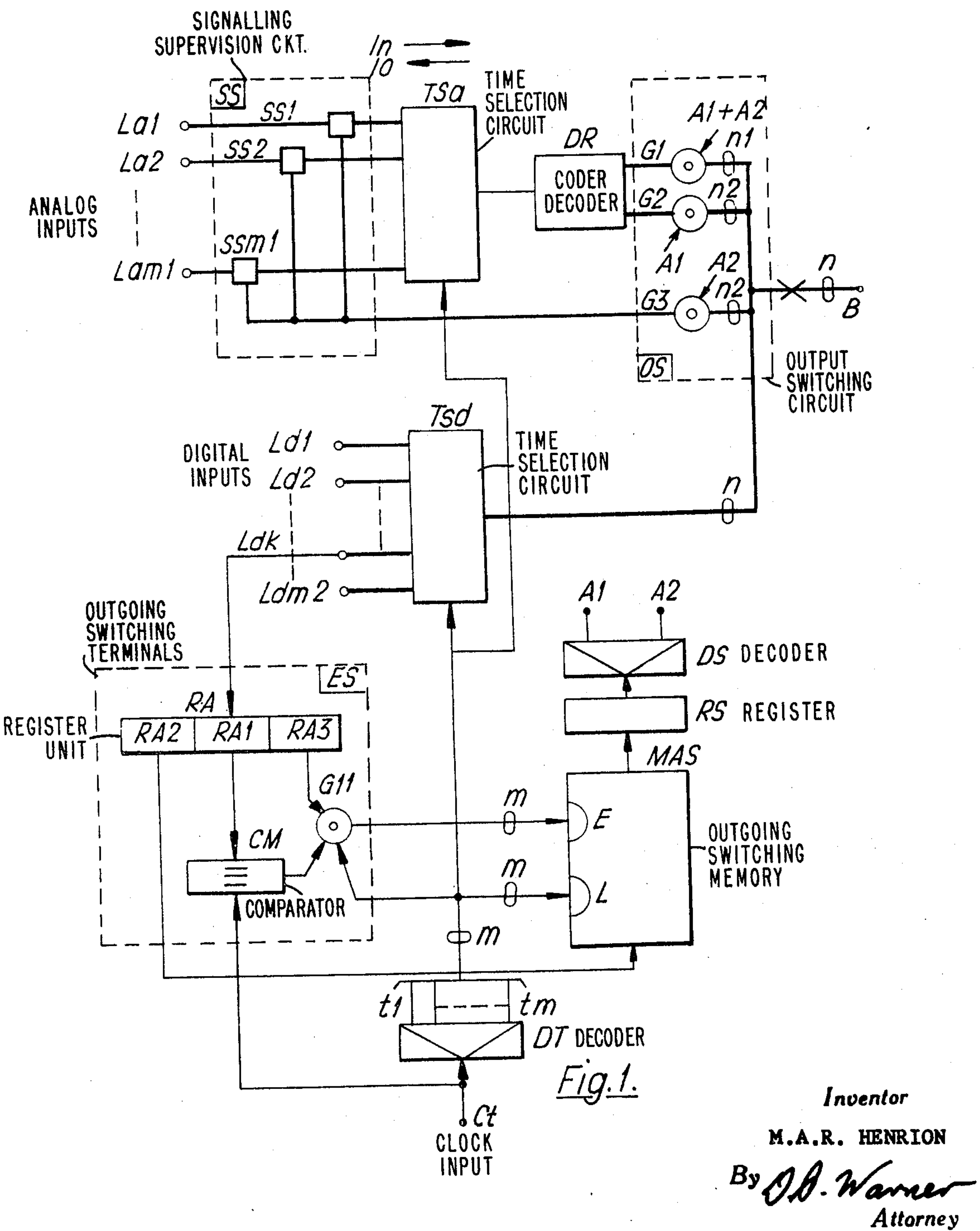

Inventor
M.A.R. HENRION
By O.B. Warner
Attorney

INTERFACE BETWEEN ANALOG OR DIGITAL LINES AND A PULSE CODE MODULATION CIRCUIT

The present invention concerns an interface circuit associated with a PCM (pulse code modulation) telecommunications network for controlling bidirectional message exchanges between a PCM network and various terminals which connect to subscriber sets, space switching centers, analog or digital data sets, etc. In particular, the invention relates to the exchange of coded signalling data by various methods.

It will be noted that the considered PCM telecommunications network may comprise either one or several PCM switching centers connected together and to interface circuits by means of PCM tranmission systems or a single PCM transmission system. In this last case, the PCM system is used to assure the connection of an interface circuit with a space switching center.

In both cases, two different types of coded information are transmitted on the transmission system; the data messages (for example the speech codes for a connection between telephone subscribers) and the service messages concerning either data acquisition operations (i.e., the states of the terminal loops) or terminal remote control operations.

In an integrated PCM system, these two types of n-bit messages are transmitted in an identical way and are distributed between the m time channels available in the PCM transmission system.

The present invention is provided to enable the use with an integrated PCM system of this kind, any type of analog terminal or of compatible digital terminal using a pulse or a MFC (multifrequency) signalling scheme.

It will be noted that the expression "compatible digital terminal" designates a terminal which supplies information at the PCM system format.

One is thus brought to group the types of messages as follows:

- The analog or digital data messages and the service messages for remote control operations which are transmitted as n-bit codes,
- The data acquisition service messages which comprise:

Digit information,

Information concerning the state of the loop which connects an operating terminal to the switching center.

According to the signalling scheme used by each such terminal (DC, AC or MFC signalling), the interface circuit controls a particular distribution of the code bits and the same interface circuit is adapted for the processing of all signalling schemes.

This circuit assures the two following functions:

- Coding and decoding of information delivered by the analog terminals,
- Selection of the type of connection to be set up in relation to the signaling scheme.

Thus, in the case of a subscriber's set using MFC signalling, the coder supplies n1 bits identifying the digit ($n1 < n$) and the state of the loop is given by $n2$ bits ($n = n1 + n2$) supplied directly by a signalling supervision circuit associated with the subscriber's line. This $n$-bit code is then transmitted over the channel assigned to the connection as if it were a data or remote control message.

The object of the present invention is thus to achieve an interface circuit for a PCM switching network whereby any type of analog or digital terminal using a pulse or MFC signalling scheme can be processed in said network.

According to the invention, there are provided in the interface circuit, selection means operating in register phase for separating, on the PCM side, the signalling data concerning on the one hand the loop state and on the other hand the numbering (in the case of the MFC or voice frequency numbering) or the dialling tone, means for controlling said selection means with codes delivered by a cyclic memory and means for transmitting these codes to a PCM switching center.

Figure 2:
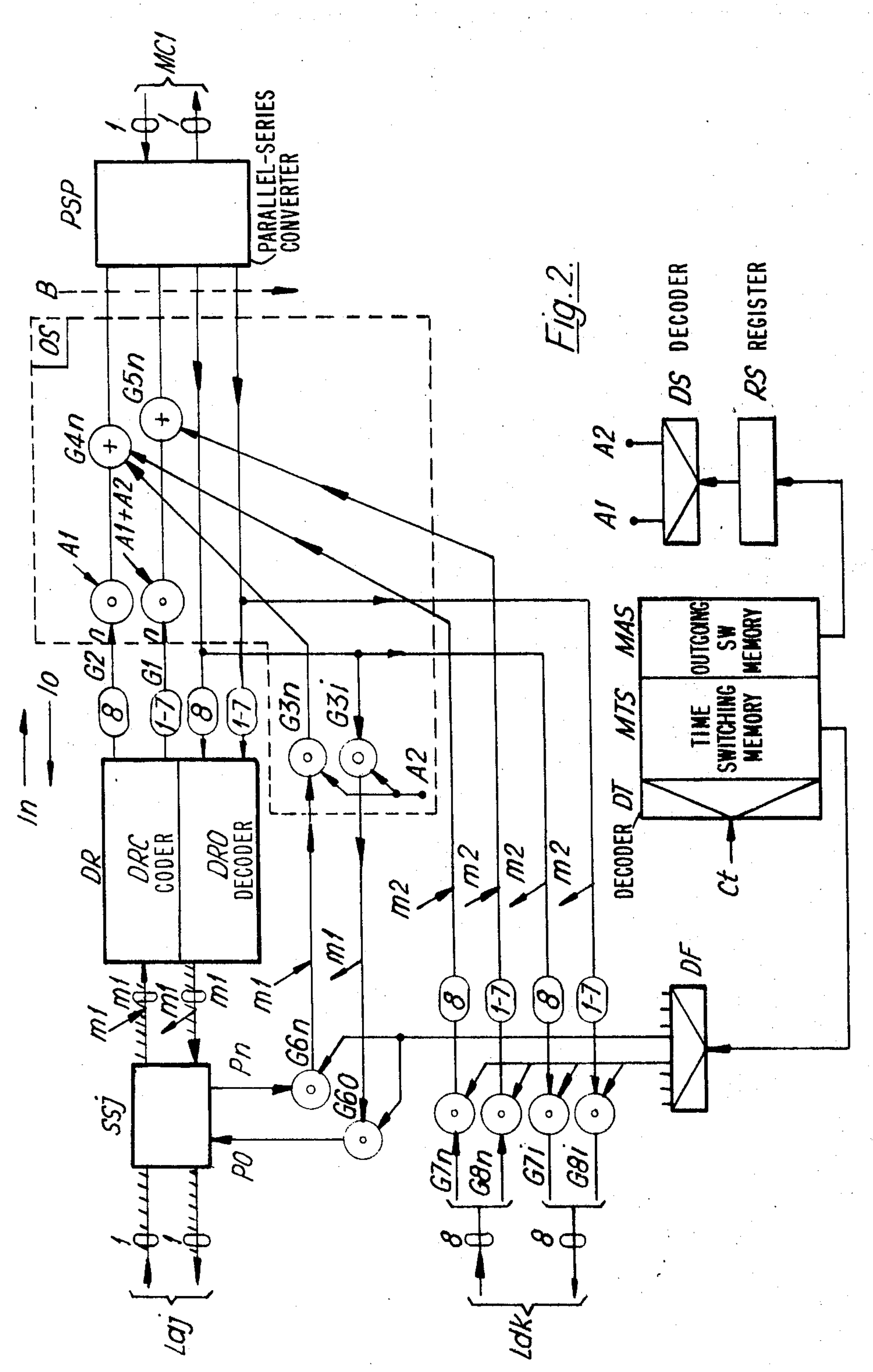

The above mentioned and other features and objects of this invention will become apparent by reference to the following description taken in conjunction with the accompanying drawings in which:

FIG. 1 represents the general diagram of the interface circuit according to the invention, FIG. 2 represents the detailed diagram of this circuit in the general case.

FIG. 1 represents the general diagram of the interface circuit according to the invention which enables to control the bidirectional data exchange between the analog terminals connected to the lines L*a*1, L*a*2 . . . L*am*1, of the digital terminals connected to the lines L*d*1, L*d*2 . . . L*dm*2 and a transmission PCM system connected to the output B.

This transmission system comprises $m$ channels over which are transmitted messages with $n$ bits per channel and it delivers, to the interface circuit, clock signals obtained in a well known way. In particular, it supplies $m$ channel codes Ct per PCM frame which are applied to the decoder DT. This latter delivers, in each frame, a succession of signals $t1$, $t2$ . . . $tm$ defining the $m$ time channels of the frame.

The interface circuit comprises:

- The block S*s* of the signalling supervision circuits which comprises the circuits S*s*1, S*s*2 . . . S*sm*1 associated with the $m1$ analog lines L*a*1, L*a*2 . . . L*m*1,
- The time selection circuits TS*a* and TS*d* associated respectively with the analog lines and with the digital lines. The TSa circuit assures the sampling of the $m1$ analog data in the incoming direction In (information coming from the terminals, refer to FIG. 1) and the demultiplexing in the outgoing direction I*o*. The circuit TS*d* controls a simple time selection, in both directions of the messages supplied by the $m2$ compatible digital terminals. These two circuits are directly controlled by the channel time slot signals in the case where $m1 + m2 \leq m$, one signal being assigned to the selection of each one of the lines. The general case will be studied in relation with FIG. 2.
- The coder-decoder DR associated with the TS*a* circuit which processes, on the PCM side $n$-bit codes presented in parallel form,
- The output switching circuit OS which enables the establishment of a bidirectional selective connection between the coder DR or the block S*s* and the terminal B of the interface circuit,
- The outgoing switching memory MAS which comprises at least ($m1 + m2$) addresses, each one being assigned to one of the ($m1 + m2$) lines L*a* and L*d*. By way of example, it will be assumed that this memory comprises m addresses read in a cyclic way by the same signals as those which control the circuits TS*a* and TS*d*. Each address of the memory contains one of the three codes C0, C1, CA2, these last two codes giving respectively, by means of the decoder DS, the signal A1 and A2. These signals are used for controlling the selective connection in the circuit OS.

By way of a non limitative example, one will assume that this memory MAS is of the non destructive readout type.

— The outgoing switching terminal ES associated to the line L*dk* is used for receiving, from the line B, the information to be written in the memory MAS. This terminal, represented in a very simplified way, comprises the register unit RA in which is stored the block of received messages and the comparator CM. Each block of messages comprises a memory address which is stored in the register RA1 (for instance the code C*r* which identifies the address) the information (code C0, CA1, CA2) which is stored in the register RA2 and a code of end of block C*f* which is stored in the register RA3. When the register contains the code C*f*, the multiple gate G11 is activated as soon as the code C*t* supplied by the clock is identical to the code C*r* written in RA1. This gate controls the write selection of the address r (input of the memory referenced "E") and the code stored in RA2 is transferred into this address.

It is realized that this write operation is carried out at a time slot different from that used for the cyclic readout; for instance the beginning of a channel time slot is reserved to the readout of an address and to the transfer of its contents in the register RS and the end of this time slot is reserved for an eventual writing operation.

This interface circuit operates as follows:

1. Digital data and remote control messages

These *n*-bit messages which comprise *n* bits and which circulate through the selection circuit TS*d* are transmitted directly between this circuit and the terminal B without the intervention of the circuit OS. The corresponding addresses of the memory MAS contain CO codes.

2. Analog data messages

These messages are transmitted through the circuit T*sa* and the analog-digital (or digital-analog) conversion is carried out in the coder-decoder DR. Between this unit and the output B, the *n*-bit codes are transmitted through the circuit OS wherein the selection is carried out by means of the signal A1 (gates G1 and G2). A line Lar and the corresponding channel *r* on the PCM side used for the transmission of such messages are then identified by the reading, at the channel time *tr*, of the code CA1 stored in the address *r*.

3. "Register phase" messages

They comprise the following two types of informations:

Digit information,

Loop status information.

According to the signalling scheme used by the terminal, the transmission of this information in the incoming direction In is carried out, on the PCM side, according to either type of formats:

a. Format F1: the two types of information are transmitted over the *n*2 less significant bits of the code ($n2 < n$), b. Format F2: the digit information is transmitted over *n*1 bits and the loop status information is transmitted over *n*2 bits ($n = n1 + n2$).

For both types of format:

— The selection in the circuit OS is controlled by the signal A2 (gates G1 and G3) and it will be seen, in relation with the description of FIG. 2, that the *n*1 bits which are not used in the format F1 have zero value.

— The *n*2 less significant bits of the code are supplied, in the incoming direction I*n*, by the supervision unit S*s* and the selection in the circuit OS is carried out by means of the gate G3. In the direction I*o* these bits are applied to the circuit S*s*.

In the case of the format F2, the most significant *n*1 bits are processed as analog data messages by the coder-decoder DR, the selection in the circuit OS being caRried out by means of the gate G1.

FIG. 2 is a detailed diagram of the interface circuit on which have been represented the circuits related to the analog line L*aj* and to the digital line L*dk* together with the multiples related to the *m*1 lines L*a* and to the *m*2 lines L*d*.

In the figure, there has been chosen by way of example, $n = 8$, $n1 = 7$, $n2 = 1$.

In the circuit DR, the coder has been designated by "DRC" and the decoder by "DRO." The circuit OS, which is common to all the lines L*a*, comprises the AND circuits G1*n*, G2*n*, G3*n*, G3*i* and the OR circuits G4*n*, G5*n*, the suffix "*n*"("*o*") being used for the gates controlling the transmission in the direction I*n* (I*o*).

If one considers the digital lines, it is seen that each of them is controlled by two AND circuits for each direction, vizus G7*n*, G8*n*, G7*i* and G8*i*. According to the mode of time selection described in relation with FIG. 1 (case where $m1 + m2 \leqslant m$), these gates would be controlled by one of the channel time slot signals supplied by the decoder DT. In the FIG. 2 which corresponds to the general case where $m1 + m2 \geqslant m$, this signal is supplied by the decoder DF which receives its information from a memory MTS which will be described further on.

For the analog lines, and in particular for the line L*aj*, the control concerns only the loop status information vizus:

— Incoming loop status information P*n* supplied by the circuit S*sj* and applied to the AND circuit G6,

— Outgoing loop status information P*o* received from the PCM system and applied to the AND circuit G6.

The control of these gates is carried out in the same way as for the digital lines.

It will be noted that, in this FIG. 2, one has assumed that the PCM transmission was carried out in series form with one line per direction of transmission. The circuit PSP controls the series-parallel and the parallel-series conversions in such a way as the bits may be processed separately in the interface circuit.

In the circuit of FIG. 1, limited to the case where $m1 + m2 \leqslant m$, the memory MAS controlled the outgoing switching, i.e., the discrimination between the "register phase messages" and the other types of messages. In FIG. 2, one has represented a circuit enabling to control $m1 + m2 \geqslant m$ lines.

These switching operations are controlled by a time switching memory MTS which is a cyclic memory comprising, as the memory MAS, m addresses. Each one of these addresses is reserved to the writing of a code identifying the terminal to be selected at the time of the reading of this address; thus, if the exchange of messages between the terminal L*aj* and the PCM system must be carried out over the channel *r*, the code C*j* which identifies this terminal is written in the address of the memory MAS. In this mode of achievement, both these memories MTS and MAS are selected by the same codes C*t* applied to the decoder DT.

As has been mentioned previously, the messages in "register phase" (signal A2) are transmitted under one of the formats F1 or F2 according to the signalling scheme used by the terminals, the expresson "terminal" covering subscriber's sets as well as transmitters-receivers of analog or digital data and space switching centers.

Table 1 hereafter gives, in a brief and non-limitative way, the characteristics of some common signalling schemes. It will be noted that each signalling supervision circuit such as S*sj* (FIG. 2) is specialized for the signalling scheme used on the line with which it is associated.

Last, in the AC signalling, the information is transmittd by the subcarrier on the side of the lines La and as D.C. pulses on the PCM side, the conversion being achieved in the signalling supervision circuits.

TABLE 1

Characteristics of the main signalling schemes

| Symbol | Numbering information | Other information |
|---|---|---|
| DC | One D.C. pulse per unit (change of the loop status). | Supplied by the loop status, the direction or the amplitude of the current, etc. |
| AC | Subcarrier (voice frequency signals) modulated in duration in order to obtain bursts of calibrated duration. | Supplied by bursts the duration of which is different from those used in numbering. |
| MFC | Multifrequency code, for instance two out of six frequency code. | As in DC signalling |

Table 2 gives the distribution of the *n* bits of a PCM channel according to the type of connection and to the signalling scheme and Table 3 gives the meaning of some symbols used in this Table 2.

It will be noted, by examining Table 2, that:

— In the cases 2 and 5 (MFC signalling), the expression "coded frequencies" designates the $n1 = 7$ bit codes supplied by the coder DRC (FIG. 2) in response to the multifrequency codes.

— In the incoming direction In, one may transmit two informations at the same time to the PCM system (cases 2 and 5) whereas in the outgoing direction I*o*, one always transmits only a single loop status or TRON line command.

In the interface circuit which has just been described in relation with FIGS. 1 and 2, one has assumed that the n bits were distributed into two groups comprising each a fixed number of bits, vizus *n*1 and *n*2. It is realized that, for certain signalling schemes, it might be necessary to assign different values to the numbers *n*1 and *n*2. In this case, the conductors in the circuit OS are grouped in order to be able to achieve all the necessary combinations and the gates located in this circuit are controlled by codes CA1, CA2*a*, CA2*b*, etc . . . , each of these codes CA2*a*, CA2*b*, etc . . . characterizing a different combination of bits.

While the principles of the above invention have been described in connection with specific embodiments and particular modifications thereof it is to be clearly understood that this description is made by way of example and not as a limitation of the scope of the invention.

I claim:

1. An interface circuit for the control of bidirectional data exchanges between (1) a plurality of transmission lines connected to terminals such as subscriber's sets, pace switching centers, and transmitter-receivers of digital and analog data, and (2) a local or remote data switching center which operates in PCM and in time multiplex, the connection being made through a PCM transmission system, said interface circuit comprising:

TABLE 2

Distribution of the n bits of the PCM channel in the register phase

| Type of link | Signalling scheme: Case | Desig-nation | Format | Bits 1–7: In | Io | Bit 8: In | Io |
|---|---|---|---|---|---|---|---|
| Between data terminal and register. | 1 | DC | F1 | CO | Dialing tone (cases 1 and 2) | Collection of the loop status. | Control of the loop status.[1] |
| | 2 | MFC | F2 | Coded frequencies | | | |
| Between registers | 3 | DC | F1 | CO | CO | Collection of the line status RON. | Control of the line status TRON. |
| | 4 | AC | F1 | CO | CO | | |
| | 5 | MFC | F2 | Coded frequencies | Coded frequencies[2] | As in the cases 3 and 4 according to the type of supervision of the loop status. | |

[1] To assure the holding of the loop status.
[2] Signal of reception acknowledgement.

TABLE 3

Meaning of the symbols used in table 2

| Symbol | Meaning |
|---|---|
| In | Incoming direction; information received from the analog terminals |
| Io | Outgoing direction; information transmitted to the analog terminals |
| CO | No information is transmitted over these bits (code zero) |
| Line RON | line connected to the receiver of the register |
| Line TRON | Line connected to the sender of the register |

an analog data transmission line, associated with a signalling supervision circuit supplying a multiple bit code of first bit length characterizing the incoming signalling status of a terminal; analog lines connected to a first time selection circuit functioning as a sampling circuit in the incoming direction and as a demultiplexer in the outgoing direction; a plurality of digital data transmission lines on which are transmitted plural bit codes, said last-mentioned lines being connected to a second time selection circuit; a clock delivering a succession of channel codes to supply through a decoder a series of channel time slot signals, said codes and signals being synchronized at the time base of the PCM transmission system; means for assigning each channel time slot to a selection of a transmission line within either time selection circuit; means connecting the first time selection circuit to a coder-decoder having a capacity equal to the number of channel code bits to carry out the coding of the incoming analog information, and the decoding of the messages received from the PCM transmission equipment, each incoming and outgoing coded message comprising messages of a second code length comprised of sub-messages constituting a loop or line status code; means for carrying out directly the connection with the PCM transmission line in the case of messages of said second code length exchanges between a circuit time selection circuit and said line; a circuit carrying out the connection with the PCM transmission line through an outgoing switching circuit in the case of the codes related to the lines, said circuit comprising a multiple gate controlling the transmission of first code length between the coder-decoder and the PCM line, a multiple gate controlling the transmission of messages of said first bit length gate controlling the transmission of a like plurality of bits between the signalling supervision circuit and the PCM line; means for controlling said gates including an outgoing switching member of the nondestructive readout type, said memory comprising a number of addresses equal to the number of channels read cyclically under the control of the channel time slot signals, each address containing one of three codes, the first code being written in each address corresponding to the time of selection of a line, a second code being written in each address corresponding to a line, the second code controlling the opening of a pair of gates, the third code controlling the opening of a pair of gates G1 and G3 so that one may choose between the utilization of the bit length of messages for representing analog data and the utilization of submessages only for representing said data, with the remaining bits of the message being used for characterizing the incoming or outgoing signalling status.

2. An interface circuit according to claim 1, in which a digital data receiver having cyclic memory capability and an address register is assigned permanently to the reception of information coming from said PCM system and intended to be stored in the cyclic memory and the entire information message is written in said register including the address where it must be transferred, the register controlling first the selection of said address, and second the writing of the information.

* * * * *

UNITED STATES PATENT OFFICE
CERTIFICATE OF CORRECTION

Patent No. 3,761,637 Dated September 25, 1973

Inventor(s) Michel Andre Robert Henrion

It is certified that error appears in the above-identified patent and that said Letters Patent are hereby corrected as shown below:

Column 6, line 37, "pace" should read -- space --.

Column 7, line 23, "member" should read -- memory --.

Signed and sealed this 26th day of March 1974.

(SEAL)
Attest:

EDWARD M.FLETCHER,JR.
Attesting Officer

C. MARSHALL DANN
Commissioner of Patents

ORM PO-1050 (10-69)

USCOMM-DC 60376-P69
☆ U.S. GOVERNMENT PRINTING OFFICE : 1969 O—366-334.